United States Patent
Fenton et al.

(10) Patent No.: US 10,787,144 B1
(45) Date of Patent: Sep. 29, 2020

(54) HEADLINER BAR ASSEMBLY FOR COMPLIANT AIRBAGS

(71) Applicant: Fenton Mobility Products, Inc., Jamestown, NY (US)

(72) Inventors: Scott Ivan Fenton, Sinclairville, NY (US); Damon Lee Brown, Little Valley, NY (US); Gerald James Hildom, Jamestown, NY (US)

(73) Assignee: Fenton Mobility Products, Inc., Jamestown, NY (US)

( * ) Notice: Subject to any disclaimer, the term of this patent is extended or adjusted under 35 U.S.C. 154(b) by 347 days.

(21) Appl. No.: 15/684,509

(22) Filed: Aug. 23, 2017

(51) Int. Cl.
*B60R 21/213* (2011.01)
*B60R 21/232* (2011.01)

(52) U.S. Cl.
CPC .......... *B60R 21/213* (2013.01); *B60R 21/232* (2013.01)

(58) Field of Classification Search
CPC .............................. B60R 21/213; B60R 21/232
USPC ............................................ 280/728.2, 730.2
See application file for complete search history.

(56) References Cited

U.S. PATENT DOCUMENTS

| | | | | |
|---|---|---|---|---|
| 3,538,643 A * | 11/1970 | Omlie | ...................... | B60J 10/80 49/311 |
| 6,652,021 B1 * | 11/2003 | Dykman | ............. | B60R 13/0225 296/214 |
| 6,669,214 B1 * | 12/2003 | Domis | ...................... | B25H 3/00 280/47.19 |
| 6,902,187 B2 * | 6/2005 | Sonnenberg | .......... | B60R 21/201 280/730.2 |
| 7,156,413 B2 * | 1/2007 | Fischer | ................. | B60R 21/213 280/728.2 |
| 7,320,477 B2 * | 1/2008 | Kawabe | ................ | B60R 21/213 280/728.2 |
| 7,367,582 B2 * | 5/2008 | Nishizawa | ............ | B60R 21/232 280/730.2 |
| 7,523,958 B2 * | 4/2009 | Jang | ...................... | B60R 21/213 24/289 |
| 7,770,914 B2 * | 8/2010 | Dumbrique | ........... | B60R 21/205 280/728.2 |
| 7,780,187 B2 * | 8/2010 | Minamikawa | ........ | B60R 21/201 24/458 |
| 8,172,258 B2 * | 5/2012 | Kim | ...................... | B60R 21/213 280/728.2 |
| 8,317,221 B2 * | 11/2012 | Hemingway | .......... | B60N 3/026 280/728.2 |
| 9,505,368 B2 * | 11/2016 | Morrell | ................. | B60R 21/232 |
| 2006/0197316 A1 * | 9/2006 | Watanabe | ............. | B60R 21/213 280/728.2 |
| 2007/0241539 A1 * | 10/2007 | Jang | ...................... | B60R 21/213 280/728.2 |

(Continued)

*Primary Examiner* — Paul N Dickson
*Assistant Examiner* — Hilary L Johns
(74) *Attorney, Agent, or Firm* — Simpson & Simpson, PLLC (57) ABSTRACT

A headliner bar assembly for securing a compliant airbag within a vehicle, the assembly including a front mounting plate, including a first front end and a first rear end, a rear mounting plate, including a second front end arranged adjacent to the first rear end, and a second rear end, a mounting bracket arranged adjacent to the first front end, wherein the compliant airbag is secured to at least the front mounting plate and the rear mounting plate, and a panel operatively arranged to cover at least the compliant airbag, the front mounting plate, and the rear mounting plate.

19 Claims, 8 Drawing Sheets

(56) References Cited

U.S. PATENT DOCUMENTS

2017/0174175 A1* 6/2017 Kallidis ................ B60R 21/213
2017/0247008 A1* 8/2017 Witt, Jr. ................ B60R 21/213
2018/0126943 A1* 5/2018 Ma ........................ B60R 21/213
2019/0001912 A1* 1/2019 Sato ...................... B62D 65/14

* cited by examiner

HEADLINER BAR ASSEMBLY FOR COMPLIANT AIRBAGS

FIELD

The present invention relates generally to compliant airbags in vehicles, and, more specifically, to headliner bar assemblies for repositioning compliant airbags in vehicles such that they do not interfere with shiftable platform wheelchair lifts.

BACKGROUND

Typical wheelchair lifts are used to lift non-ambulatory passengers, while seated in their wheelchair, into a wheelchair accessible vehicle. Certain wheelchair lifts can be mounted proximate a side passenger door while other wheelchair lifts can be mounted through a rear cargo door. Single arm lifts are typically mounted proximate a side passenger door and used for lighter weight applications. Single arm lifts typically occupy less interior space and leave the passenger entry open. However, single arm lifts are not suitable for significant lifting capacity. Dual-arm lifts are better suited for heavier loads since they include two arms to support and distribute the weight. Dual-arm lifts occupy more interior space than single arm lifts, block the side entrance, and limit the mobility of the front passenger seat. Dual parallel arm, solid platform lifts are more simple and reliable than single arm lifts. Dual parallel arm, solid platform lifts typically outperform single arm lifts in lifting capacity.

A shiftable assembly for a platform wheelchair lift, which does not obstruct the door opening when in a stored position, is described in U.S. patent application Ser. No. 15/491,598, which application is hereby incorporated by reference in its entirety. However, on some vehicles, the compliant airbag may interfere with the wheel chair lift of the shiftable assembly. Therefore, there is a long-felt need for a headliner bar assembly for repositioning compliant airbags on vehicles such that they do not interfere with platform wheelchair lifts.

SUMMARY

According to aspects illustrated herein, there is provided a headliner bar assembly for securing a compliant airbag within a vehicle, the assembly comprising a front mounting plate, including a first front end and a first rear end, a rear mounting plate, including a second front end arranged adjacent to the first rear end, and a second rear end, a mounting bracket arranged adjacent to the first front end, wherein the compliant airbag is secured to at least the front mounting plate and the rear mounting plate, and a panel operatively arranged to cover at least the compliant airbag, the front mounting plate, and the rear mounting plate.

According to aspects illustrated herein, there is provided a headliner bar assembly for securing a compliant airbag within a vehicle, the assembly comprising a front mounting plate connected to an inside wall of the vehicle proximate an opening, the front mounting plate including a first front end and a first rear end, a rear mounting plate connected to the inside wall of the vehicle proximate a rear window, the rear mounting plate including a second front end arranged adjacent to the first rear end and a second rear end, a mounting bracket connected to a B-pillar of the vehicle, adjacent to the first front end, wherein the compliant airbag is secured to the front mounting plate, the rear mounting plate, and the mounting bracket, and a panel operatively arranged to cover the compliant airbag, the front mounting plate, the rear mounting plate, and the mounting bracket.

According to aspects illustrated herein, there is provided a headliner bar assembly that raises and secures a compliant airbag, which has the additional benefit of providing increased head room for passengers passing through the doorway, both standing and seated in a wheel chair positioned on the lift platform.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
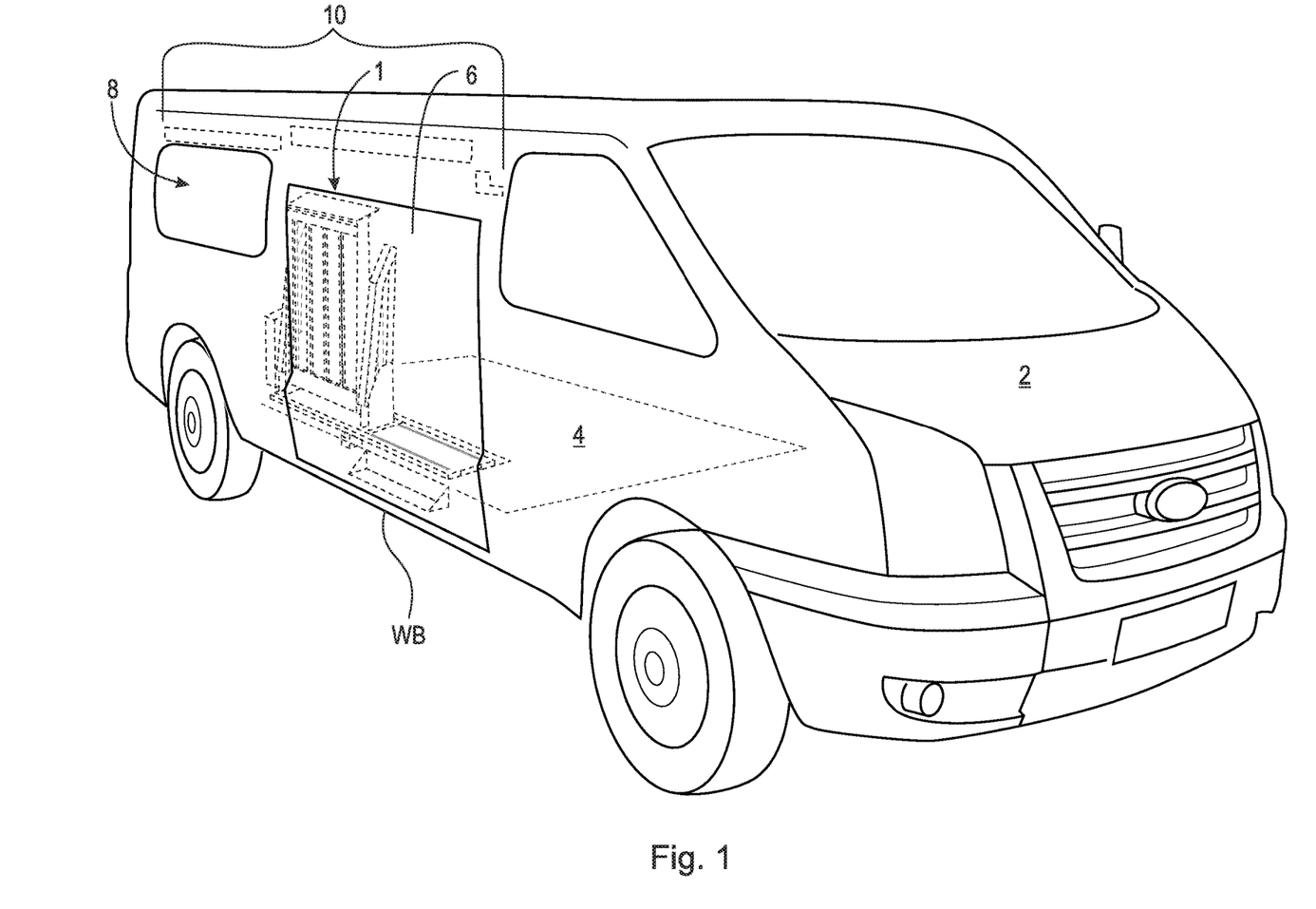
FIG. 1 is a perspective view of a headliner bar assembly installed in a vehicle with a platform wheelchair lift.

Adverting now to the figures, FIG. 1 is a perspective view of headliner bar assembly 10 installed in vehicle 2 with platform wheelchair lift 1. Headliner bar assembly 10 is designed to raise the side airbag assembly of a vehicle such that the side airbag assembly does not interfere with platform wheelchair lift 1 while remaining compliant with state and federal regulations. Headliner bar assembly 10, namely front mounting plate 20 and rear mounting plate 40 are designed for a vehicle having a medium roof, for example, a Ford® Transit medium roof cargo van. It should be appreciated, however, that headliner bar assembly 10 may also be used for a high roof vehicle, for example, a Ford® Transit high roof cargo van.

Figure 2:
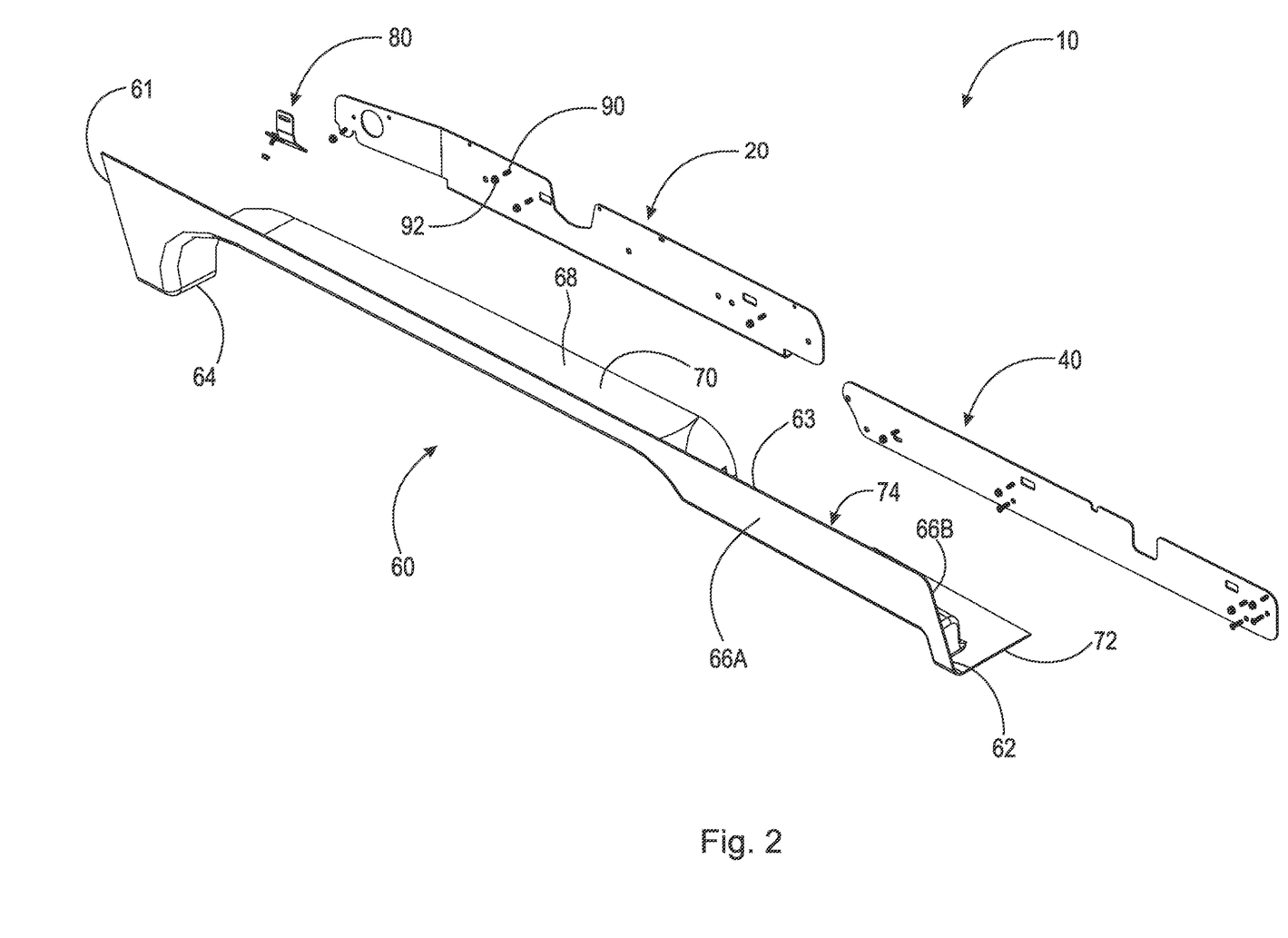
FIG. 2 is an exploded perspective view of a headliner bar assembly.

FIG. 2 is an exploded perspective view of headliner bar assembly 10. Headliner bar assembly 10 generally comprises front mounting plate 20, rear mounting plate 40, roof headliner panel 60, B-pillar mounting bracket and 80. Front mounting plate 20, rear mounting plate 40, and B-pillar mounting bracket 80 are secured to vehicle 20 via a plurality of fasteners (e.g., bolts, screws, rivets, etc.). Airbag assembly 12 (not shown) is secured to B-pillar mounting bracket 80, front mounting plate 20, and rear mounting plate 40 via a plurality of bolts 90 and nuts 92. It should be appreciated that airbag assembly 12 can be secured to B-pillar mounting bracket 80, front mounting plate 20, and rear mounting plate 40 using any suitable means, such as screws, rivets, brackets, string, etc.

Roof headliner panel 60 generally comprises end 61, end 62, top 63, bottom 64, front surface 66A, rear surface 66B, lip 68, top surface 70, bottom surface 72. Lip 68 may further comprise cutaway 74. Roof headliner panel 60 is secured either to B-pillar mounting bracket 80, front mounting plate 20, and rear mounting plate 40 using a plurality of fasteners, or to vehicle 2 using a plurality of fasteners (not shown). Rear surface 66B faces and/or abuts against B-pillar mounting bracket 80, front mounting plate 20, and rear mounting plate 40 or the inside wall of vehicle 2. Roof headliner panel 60 is secured such that when airbag assembly 12 is deployed, it does not hinder the inflation of airbag assembly 12. In an example embodiment, roof headliner panel 60 is arranged to break away from securement upon deployment of airbag assembly 12. In an example embodiment, roof headliner panel 60 comprises a flexible fabric that deforms upon deployment of airbag assembly 12. In an example embodiment, roof headliner panel 60 may include a tear away component or be secured using snaps.

Figure 3A:
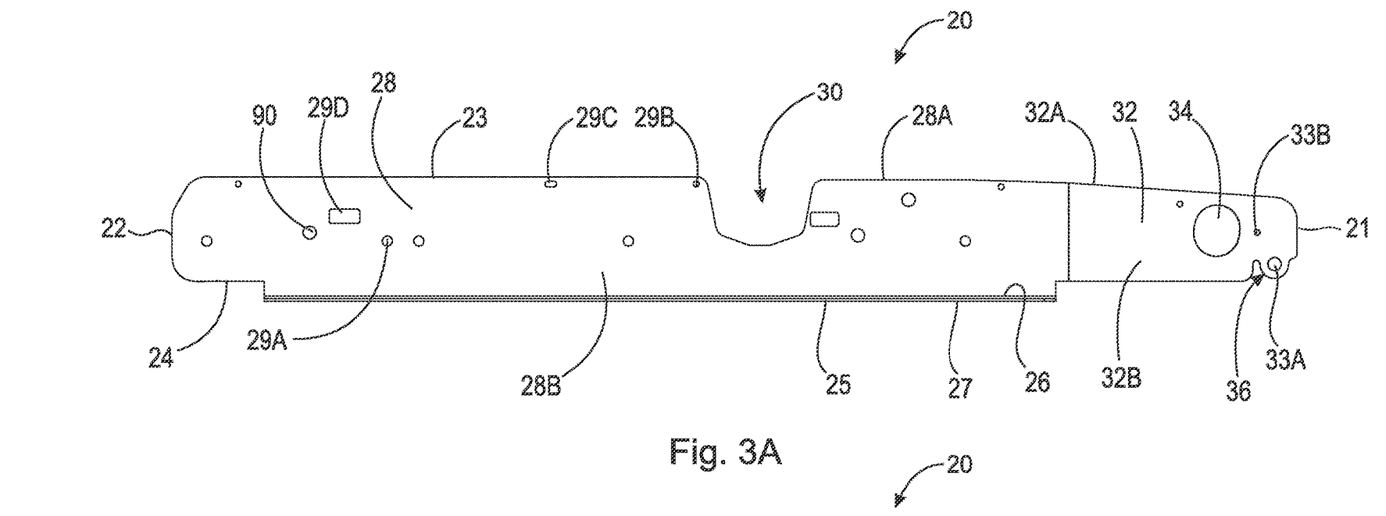
FIG. 3A is a rear elevational view of the front mounting plate shown in FIG. 2.
Figure 3B:
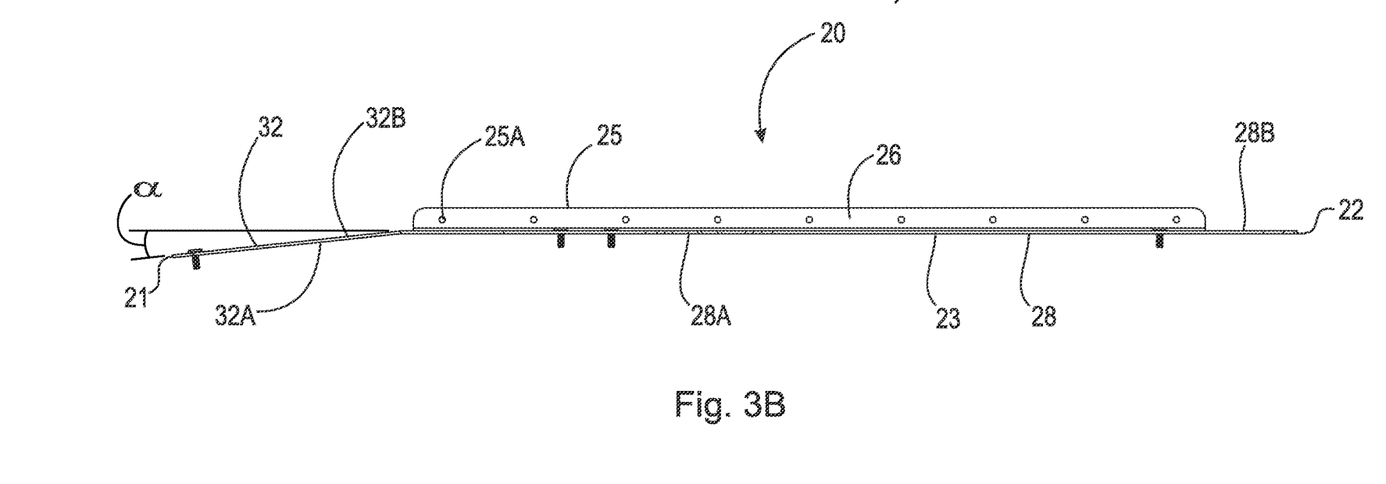
FIG. 3B is a top elevational view of the front mounting plate shown in FIG. 2.

FIG. 3A is a rear elevational view of front mounting plate 20 shown in FIG. 2. FIG. 3B is a top elevational view of front mounting plate 20 shown in FIG. 2. Front mounting plate 20 is generally arranged over opening 6 (i.e., the door of the vehicle) and extends from around the B-pillar of the vehicle to around window 8 (i.e., the back window of the vehicle). Front mounting plate 20 comprises end 21, end 22, top 23, bottom 24, section 28, and section 32. Section 28 comprises front surface 28A, rear surface 28B, lip 25, and cutout 30. Cutout 30 extends from top 23 toward bottom 24. Lip 25 extends from rear surface 28B and comprises top surface 26 and bottom surface 27. Section 32 is connected to section 28 and comprises front surface 32A, rear surface 32B, and cutout 34. In an example embodiment, section 32 and section 28 form one continuous planar surface. In an example embodiment, section 32 is connected to section 28 at angle α (see FIG. 3B). The purpose of arranging section 32 at angle α with respect to section 28 is to avoid the roof curvature of vehicle 2. Front mounting plate 20 further comprises one or more holes 29A, one or more holes 29B, one or more slots 29C, and one or more windows 29D arranged thereon. Section 32 may further comprise curvature 36 having one or more holes 33A and one or more holes 33B. Lip 25 may further comprise one or more holes 25A. Lip 25 is operatively arranged to extend into opening 6 of vehicle 2 (i.e., runs under the top of the doorway and cuts behind the weather stripping) to provide added support for front mounting plate 20. One or more fasteners may extend through one or more holes 25A to secure front mounting plate 20 to vehicle 2. Cutout 34 is arranged to avoid one or more protrusions in vehicle 2. Cutout 30 is arranged to avoid one or more roof ribs of vehicle 2. One or more windows 29D are arranged to avoid one or more protrusions of vehicle 2. It should be appreciated that front mounting plate 20 may have any number of cutouts and windows for the purpose of avoiding protrusions and obstructions of vehicle 2. It should also be appreciated that front mounting plate 20 may have any number of holes and/or slots suitable for securing front mounting plate 20 to vehicle 2 and for securing airbag assembly 12 to front mounting plate 20. When secured to vehicle 2, rear surface 28B and rear surface 32B face and/or abut against the inside wall of vehicle 2. Airbag assembly 12 is secured to front surface 28A and front surface 32B (not shown).

Figure 4:
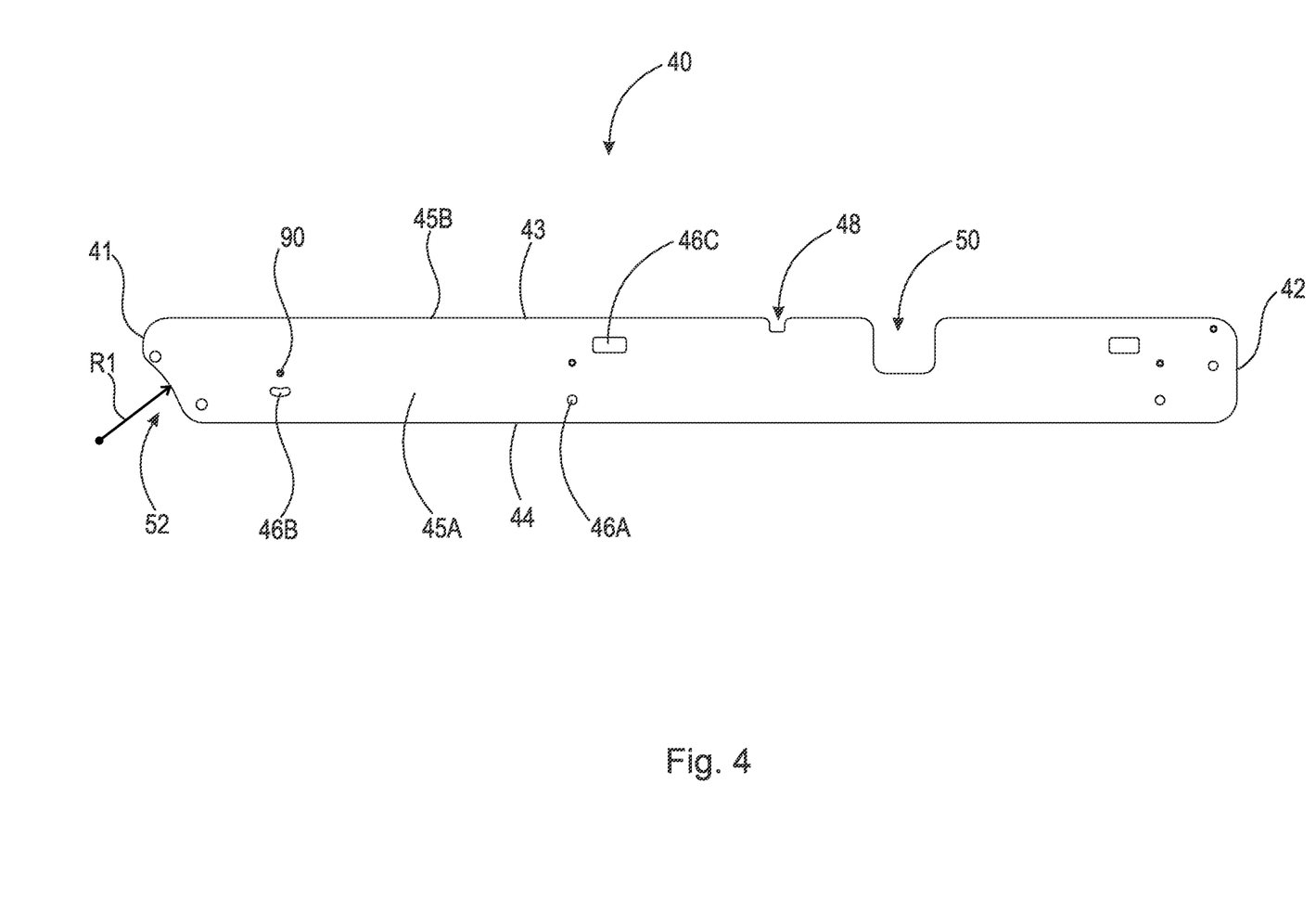
FIG. 4 is a front elevational view of the rear mounting plate shown in FIG. 2.

FIG. 4 is a front elevational view of rear mounting plate 40 shown in FIG. 2. Rear mounting plate 40 is generally arranged over window 8 (i.e., the back window of the vehicle). Rear mounting plate 40 comprises end 41, end 42, top 43, bottom 44, front surface 45A, and rear surface 45B. Rear mounting plate 40 further comprises cutout 48 and cutout 50. Cutout 48 is arranged to avoid one or more wire mounting clips arranged on vehicle 2. Cutout 50 is arranged to avoid one or more roof ribs of vehicle 2. Rear mounting plate 40 further comprises one or more holes 46A, one or more slots 46B, and one or more windows 46C. It should be appreciated that rear mounting plate 40 may have any number of cutouts and windows for the purpose of avoiding protrusions and obstructions of vehicle 2. It should also be appreciated that rear mounting plate 40 may have any number of holes and/or slots suitable for securing rear mounting plate 40 to vehicle 2 and for securing airbag assembly 12 to rear mounting plate 40. End 41 may comprise curvature 52. Curvature 52 includes radius R1. When secured to vehicle 2, rear surface 45B faces and/or abuts against the inside wall of vehicle 2. Airbag assembly 12 is secured to front surface 45A (not shown).

Figure 5:
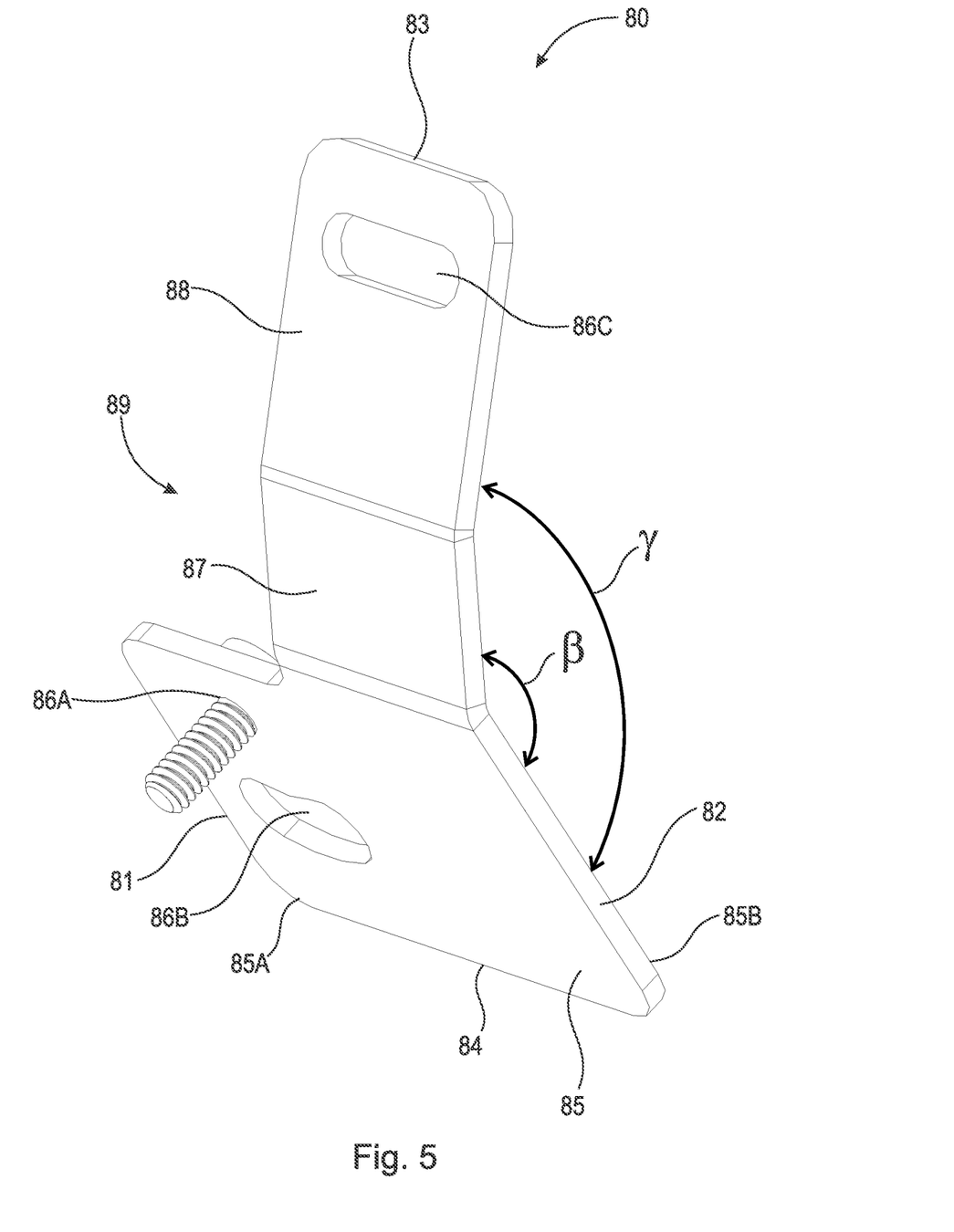
FIG. 5 is a perspective view of the B-pillar mounting bracket shown in FIG. 2.

FIG. 5 is a perspective view of B-pillar mounting bracket 80 shown in FIG. 2. B-pillar mounting bracket 80 is generally arranged on the B-pillar of the vehicle. B-pillar mounting bracket 80 comprises end 81, end 82, top 83, bottom 84, front surface 85A, and rear surface 85B. In the embodiment shown, B-pillar mounting plate 80 comprises section 85, section 87, and section 88. Section 87 is connected to section 85 and is arranged at angle β relative to section 85. Section 88 is connected to section 87 and is arranged at angle γ relative to section 85. In an example embodiment, B-pillar mounting bracket 80 is a continuous planar plate (i.e., no bends). B-pillar mounting bracket 80 further comprises one or more holes 86A, one or more slots 86B, and one or more slots 86C. It should be appreciated that B-pillar mounting bracket 80 may comprise any suitable number of holes and/or slots. B-pillar mounting bracket 80 further comprises cutaway 89. When secured to vehicle 2, rear surface 85B faces and/or abuts against the inside wall of vehicle 2. Airbag assembly 12 is secured to front surface 85A (not shown).

Figure 6:
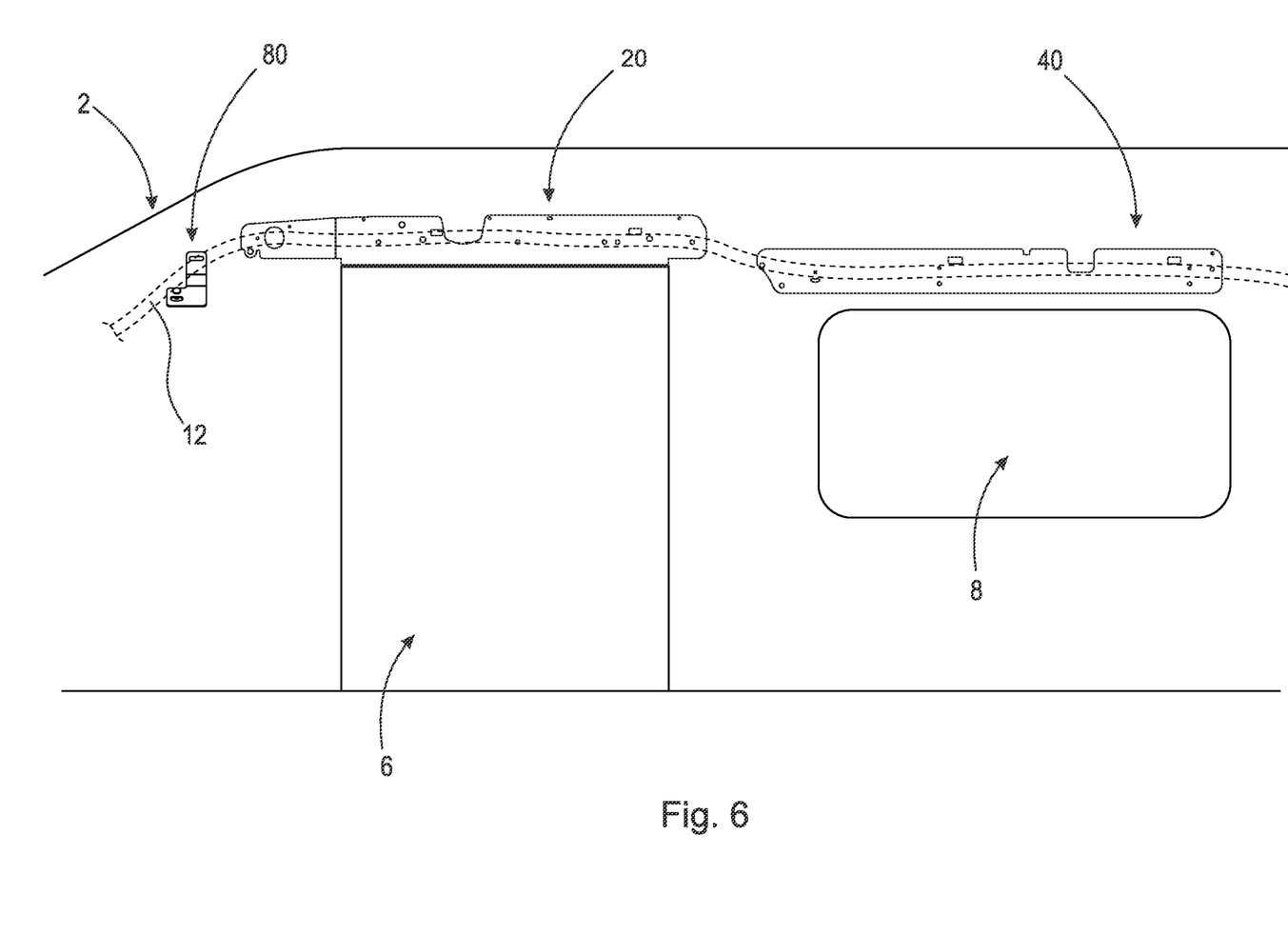
FIG. 6 is a front elevational view of a partial headliner bar assembly installed in a vehicle.

FIG. 6 is a front elevational view of a partial headliner bar assembly 10 installed in vehicle 2. Roof headliner bar 60 is removed so the positioning of the other components of headliner bar assembly 10 are visible. As shown, B-pillar mounting bracket 80 is secured to the B-pillar of vehicle 2. Front mounting plate 20 is secured to vehicle 2 generally over opening 6. Lip 25 (not shown) extends into the top of opening 6. Rear mounting plate 40 is secured to vehicle 2 generally over window 8. Airbag assembly 12 is secured to B-pillar mounting bracket 80, front mounting plate 20, and rear mounting plate 40 via bolts 90 and nuts 92.

Figure 7:
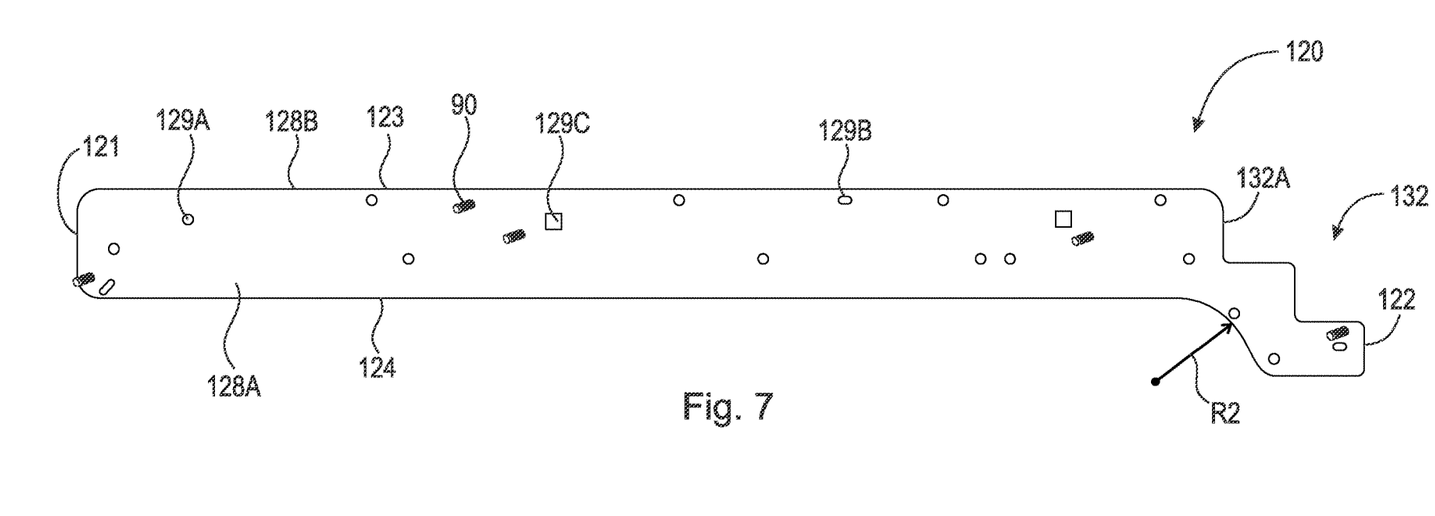
FIG. 7 is a front elevational view of a front mounting plate.

FIG. 7 is a front elevational view of front mounting plate 120. Front mounting plate 120 is designed for use in a high roof vehicle, for example, a Ford® Transit high roof cargo van. Front mounting plate 120 is generally arranged over opening 6 (i.e., the door of the vehicle) and extends from around the B-pillar of the vehicle to around window 8 (i.e., the back window of the vehicle). Front mounting plate 120 comprises end 121, end 122, top 123, bottom 124, front surface 128A, and rear surface 128B. Front mounting plate 120 further comprises stepped portion 132 proximate end 122. Stepped portion 123 extends downwardly from bottom 124 and comprises a plurality of steps 132A on a top side and a curvature having radius R2 on a bottom side. Front mounting plate 120 further comprises one or more holes 129A, one or more slots 129B, and one or more windows 129C. It should be appreciated that front mounting plate 120 may have any number of cutouts and windows for the purpose of avoiding protrusions and obstructions of vehicle 2. It should also be appreciated that front mounting plate 120 may have any number of holes and/or slots suitable for securing front mounting plate 120 to vehicle 2 and for securing airbag assembly 12 to front mounting plate 120. When secured to vehicle 2, rear surface 128B faces and/or abuts against the inside wall of vehicle 2. Airbag assembly 12 is secured to front surface 128A (not shown).

Figure 8:
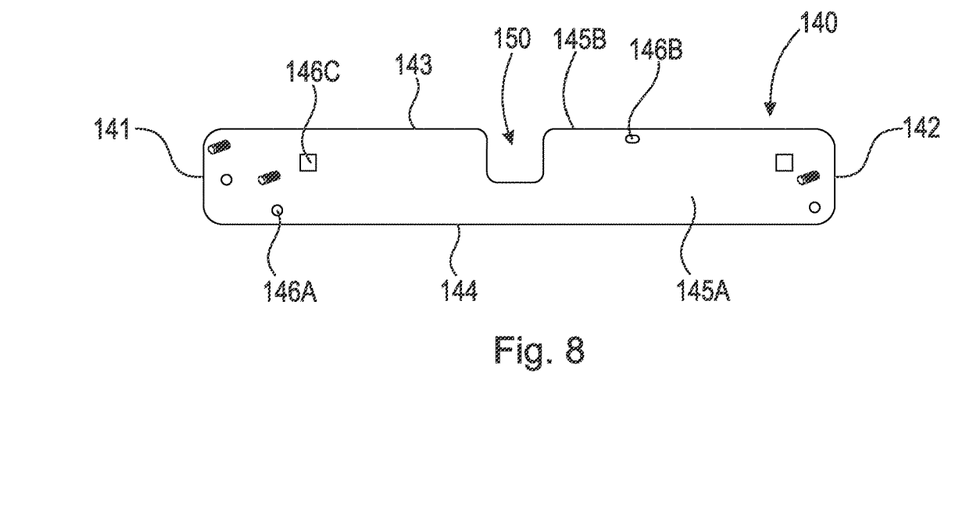
FIG. 8 is a front elevational view of a rear mounting plate.

FIG. 8 is a front elevational view of rear mounting plate 140. Rear mounting plate 140 is designed for use in a high roof vehicle, for example, a Ford® Transit high roof cargo van. Rear mounting plate 140 is generally arranged over window 8 (i.e., the back window of the vehicle). Rear mounting plate 140 comprises end 141, end 142, top 143, bottom 144, front surface 145A, and rear surface 145B. Rear mounting plate 140 further comprises cutout 150. Cutout 150 is arranged to avoid one or more roof ribs of vehicle 2. Rear mounting plate 140 further comprises one or more holes 146A, one or more slots 146B, and one or more windows 146C. It should be appreciated that rear mounting plate 140 may have any number of cutouts and windows for the purpose of avoiding protrusions and obstructions of vehicle 2. It should also be appreciated that rear mounting plate 40 may have any number of holes and/or slots suitable for securing rear mounting plate 140 to vehicle 2 and for securing airbag assembly 12 to rear mounting plate 140. When secured to vehicle 2, rear surface 145B faces and/or abuts against the inside wall of vehicle 2. Airbag assembly 12 is secured to front surface 145A (not shown).

Figure 9:
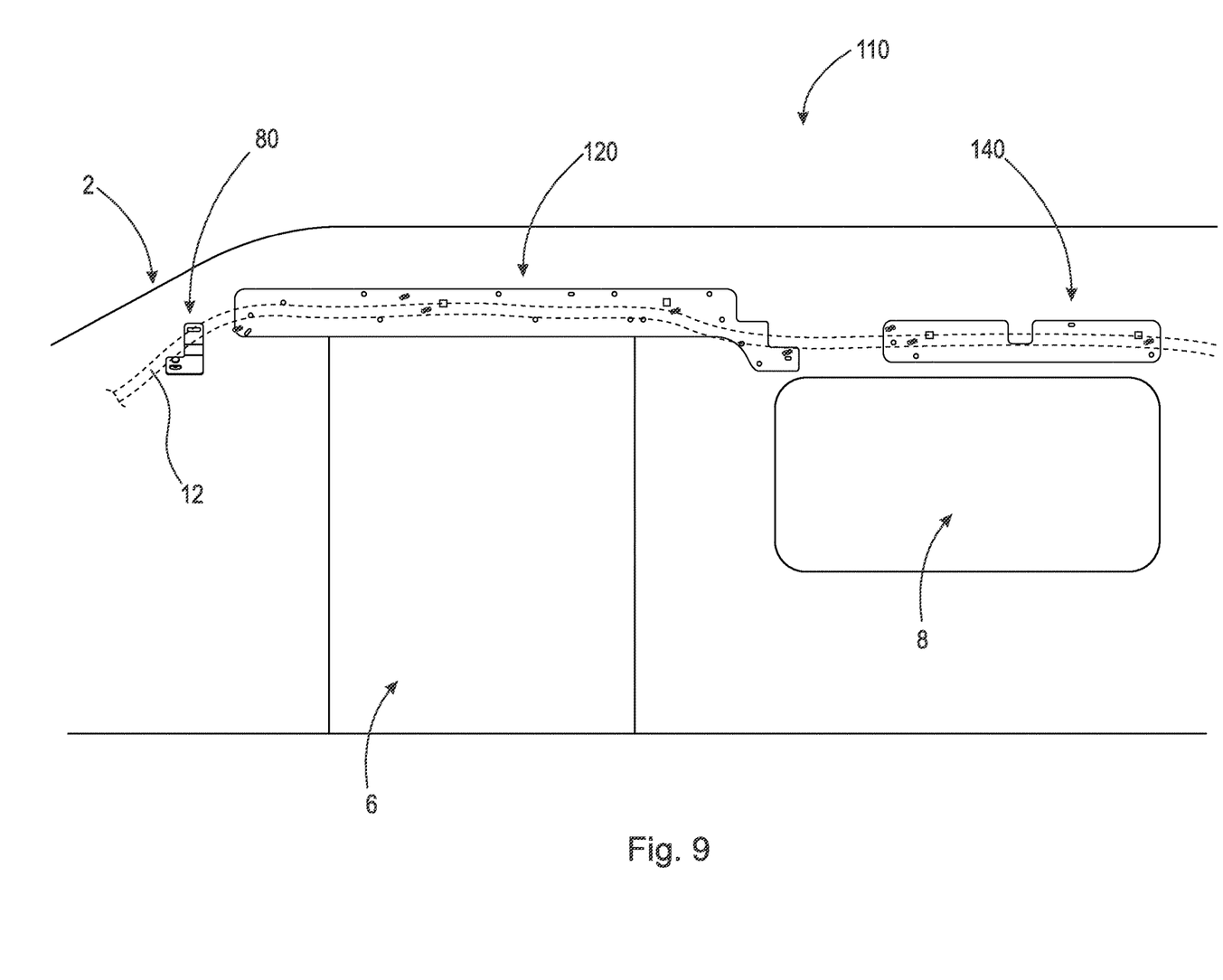
FIG. 9 is a front elevational view of a partial headliner bar assembly installed in a vehicle.

FIG. 9 is a front elevational view of a partial headliner bar assembly 110 installed in vehicle 2. Roof headliner bar 60 is removed so the positioning of the other components of headliner bar assembly 110 are visible. As shown, B-pillar mounting bracket 80 is secured to the B-pillar of vehicle 2. Front mounting plate 120 is secured to vehicle 2 generally over opening 6. Rear mounting plate 140 is secured to vehicle 2 generally over window 8. Airbag assembly 12 is secured to B-pillar mounting bracket 80, front mounting plate 120, and rear mounting plate 140 via bolts 90 and nuts 92.

It should be appreciated that various cutouts and/or windows in the components of headliner bar assembly 110 are to avoid roof ribs, protrusions, or electrical components of vehicle 2. Additionally, the installation of the headliner bar assembly 110 may require the removal of certain standard components of vehicle 2, such as air ducts.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

1 Platform wheelchair lift
2 Vehicle
4 Floor
6 Opening
8 Window
10 Headliner bar assembly
12 Airbag assembly
20 Front mounting plate
21 End
22 End
23 Top
24 Bottom
25 Lip
25A Holes
26 Top surface
27 Bottom surface
28 Section
28A Front surface
28B Rear surface
29A Holes
29B Holes
29C Slots
29D Windows
30 Cutout
32 Section
32A Front surface
32B Rear surface
33A Hole
33B Holes
34 Cutout
36 Curvature
40 Rear mounting plate
41 End
42 End
43 Top
44 Bottom
45A Front surface
45B Rear surface
46A Holes
46B Slots
46C Windows
48 Cutout
50 Cutout
52 Curvature
60 Roof headliner panel 61 End
62 End
63 Top
64 Bottom
66A Front surface
66B Rear surface
68 Lip
70 Top surface
72 Bottom surface
74 Cutaway
80 B-pillar mounting bracket
81 End
82 End
83 Top
84 Bottom
85 Section
85A Front surface
85B Rear surface
86A Holes
86B Slots
86C Slots
87 Section
88 Section
89 Cutaway
90 Bolts
92 Nuts
110 Headliner bar assembly
120 Front mounting plate
121 End
122 End
123 Top
124 Bottom
128A Front surface
128B Rear surface
129A Holes
129B Slots
129C Windows
132 Stepped portion
132A Steps
140 Rear mounting plate
141 End
142 End
143 Top
144 Bottom
145A Front surface
145B Rear surface
146A Holes
146B Slots
146C Windows
150 Cutout
WB Wheel base
R1 Radius
R2 Radius
α Angle
β Angle
γ Angle

What is claimed is:

1. A headliner bar assembly for securing a compliant airbag within a vehicle, the assembly comprising:
 a front mounting plate, including:
  a first front end;
  a first rear end;
  a first top;
  a first bottom; and,
  a lip extending perpendicularly from the first bottom, the lip operatively arranged to engage an opening of the vehicle;
 a rear mounting plate, including:
  a second front end arranged adjacent to the first rear end; and,
  a second rear end;
 a mounting bracket arranged adjacent to the first front end, wherein the compliant airbag is secured to at least the front mounting plate and the rear mounting plate; and,
 a panel operatively arranged to cover at least the compliant airbag, the front mounting plate, and the rear mounting plate.

2. The assembly as recited in claim 1, wherein the front mounting plate further comprises:
 a first section, including:
  a first cutout; and,
  the lip; and,
 a second section connected to the first section, the second section including:
  a second cutout.

3. The assembly as recited in claim 2, wherein the second section is arranged relative to the first section at an angle.

4. The assembly as recited in claim 2, wherein front mounting plate is operatively arranged to extend at least the entire length of the opening of the vehicle.

5. The assembly as recited in claim 1, wherein the rear mounting plate further comprises a cutout.

6. The assembly as recited in claim 1, wherein the front mounting plate comprises a plurality of holes and is secured to the vehicle using a plurality of fasteners.

7. The assembly as recited in claim 1, wherein the rear mounting plate comprises a plurality of holes and is secured to the vehicle using a plurality of fasteners.

8. The assembly as recited in claim 1, wherein the mounting bracket comprises:
 a first planar section;
 a second planar section connected to the first planar section; and,
 a third planar section connected to the second planar section.

9. The assembly as recited in claim 8, wherein:
 the second planar section is arranged relative to the first planar section at a first angle; and,
 the third planar section is arranged relative to the first planar section at a second angle.

10. The assembly as recited in claim 1, wherein the mounting bracket comprises a plurality of holes and is secured to the vehicle using a plurality of fasteners.

11. The assembly as recited in claim 1, wherein the second front end comprises a curvature having a radius.

12. The assembly as recited in claim 1, wherein the first rear end comprises a stepped portion and a curvature having a radius.

13. The assembly as recited in claim 1, wherein:
 the mounting bracket is secured to a B-pillar of the vehicle;
 the front mounting plate is secured to the vehicle generally over an opening therein;
 the rear mounting plate is secured to the vehicle generally over a window thereon; and,
 the compliant airbag is secured to the mounting bracket, the front mounting plate, and the rear mounting plate using a plurality of fasteners.

14. The assembly as recited in claim 13, wherein the panel is removably secured over the mounting bracket, the front mounting plate, the rear mounting plate, and the compliant airbag.

15. A headliner bar assembly for securing a compliant airbag within a vehicle, the assembly comprising:
- a front mounting plate connected to an inside wall of the vehicle proximate an opening of the vehicle, the front mounting plate including:
  - a first front end;
  - a first rear end;
  - a first section including:
    - a first cutout; and,
    - a lip operatively arranged to engage the opening; and,
  - a second section connected to the first section at an angle, the second section including a second cutout;
- a rear mounting plate connected to the inside wall of the vehicle proximate a rear window, the rear mounting plate including:
  - a second front end arranged adjacent to the first rear end; and,
  - a second rear end;
- a mounting bracket connected to a B-pillar of the vehicle adjacent to the first front end, wherein the compliant airbag is secured to the front mounting plate, the rear mounting plate, and the mounting bracket; and,
- a panel operatively arranged to cover the compliant airbag, the front mounting plate, the rear mounting plate, and the mounting bracket.

16. The assembly as recited in claim 15, wherein the front mounting plate comprises a plurality of holes and is secured to the vehicle using a plurality of fasteners.

17. The assembly as recited in claim 15, wherein the rear mounting plate further comprises:
- a cutout; and,
- a plurality of holes and is secured to the vehicle using a plurality of fasteners.

18. The assembly as recited in claim 15, wherein the mounting bracket comprises:
- a first planar section;
- a second planar section connected to the first planar section at a first angle; and,
- a third planar section connected to the second planar section and arranged relative to the first planar section at a second angle, wherein the mounting bracket comprises a plurality of holes and is secured to the vehicle using a plurality of fasteners.

19. The assembly as recited in claim 15, wherein:
- the compliant airbag is secured to the mounting bracket, the front mounting plate, and the rear mounting plate using a plurality of fasteners; and,
- the panel is removably secured over the mounting bracket, the front mounting plate, the rear mounting plate, and the compliant airbag.

* * * * *